US008623470B2

(12) United States Patent
Luhrs et al.

(10) Patent No.: US 8,623,470 B2
(45) Date of Patent: Jan. 7, 2014

(54) PROCESS TO MAKE CORE-SHELL STRUCTURED NANOPARTICLES

(75) Inventors: Claudia Luhrs, Rio Rancho, NM (US); Jonathan Phillips, Rio Rancho, NM (US); Monique N. Richard, Ann Arbor, MI (US)

(73) Assignees: Toyota Motor Engineering & Manufacturing North America, Inc., Erlanger, KY (US); STC.UNM, Albuquerque, NM (US)

( * ) Notice: Subject to any disclaimer, the term of this patent is extended or adjusted under 35 U.S.C. 154(b) by 854 days.

(21) Appl. No.: 12/143,398

(22) Filed: Jun. 20, 2008

(65) Prior Publication Data

US 2009/0317557 A1    Dec. 24, 2009

(51) Int. Cl.
*H05H 1/24* (2006.01)
*B05D 7/00* (2006.01)

(52) U.S. Cl.
USPC ........................................ 427/569; 427/215

(58) Field of Classification Search
USPC ............... 427/577, 249.6, 569, 212, 215, 216
See application file for complete search history.

(56) References Cited

U.S. PATENT DOCUMENTS

| 3,585,434 | A | * | 6/1971 | Kato et al. ..................... 313/161 |
| 4,943,345 | A | * | 7/1990 | Asmussen et al. ............... 216/69 |
| 5,456,986 | A | | 10/1995 | Majetich et al. |
| 5,489,449 | A | | 2/1996 | Umeya et al. |
| 5,547,748 | A | | 8/1996 | Ruoff et al. |
| 5,593,740 | A | * | 1/1997 | Strumban et al. ............. 427/577 |
| 5,780,101 | A | | 7/1998 | Nolan et al. |
| 5,783,263 | A | | 7/1998 | Majetich et al. |
| 5,876,684 | A | * | 3/1999 | Withers et al. ............ 423/445 B |
| 5,965,267 | A | | 10/1999 | Nolan et al. |
| 5,989,648 | A | * | 11/1999 | Phillips ......................... 427/456 |
| 6,582,763 | B1 | * | 6/2003 | Nishimura et al. ........... 427/216 |
| 6,689,192 | B1 | | 2/2004 | Phillips et al. |
| 7,220,463 | B2 | | 5/2007 | Gurevich et al. |
| 2004/0009118 | A1 | | 1/2004 | Phillips et al. |

OTHER PUBLICATIONS

Bystrezejewski et al., Large scale continuous synthesis of carbon-encapsulated magnetic nanoparticles, Nanotechnology, 18:14 (Mar. 6, 2007).*
Wang et al., Synthesis and electrochemistry properties of Sn-Sb ultrafine particles as anode of lithium-ion batteries, Journal of Alloys and Compounds, 439 (Oct. 2, 2006), 350-354.*

(Continued)

*Primary Examiner* — Michael Cleveland
*Assistant Examiner* — Tabatha Penny
(74) *Attorney, Agent, or Firm* — Gifford, Krass, Sprinkle, Anderson & Citkowski, P.C.

(57) ABSTRACT

Disclosed is a process for making a composite material that contains core-shell structured nanoparticles. The process includes providing a precursor in the form of a powder a liquid and/or a vapor of a liquid that contains a core material and a shell material, and suspending the precursor in an aerosol gas to produce an aerosol containing the precursor. In addition, the process includes providing a plasma that has a hot zone and passing the aerosol through the hot zone of the plasma. As the aerosol passes through the hot zone of the plasma, at least part of the core material and at least part of the shell material in the aerosol is vaporized. Vapor that contains the core material and the shell material that has been vaporized is removed from the hot zone of the plasma and allowed to condense into core-shell structured nanoparticles.

17 Claims, 3 Drawing Sheets

(56) References Cited

OTHER PUBLICATIONS

Bystrzejewski et al., Large scale continuous synthesis of carbon-encapsulated magnetic nanoparticles, Nanotechnology, 2007 p. 1-9.*
Giersig et al., Direct Observation of Chemical Reactions in Silica-Coated Gold and Silver Nanoparticles, Advanced Materials, 1997, p. 570-575.*
Jung et al., Sn-Carbon Core-Shell Powder for Anode in Lithium Secondary Batteries, Journal of the electrochemical society, 152 (7), p. A1452-A1457, Jun. 16, 2005.*

* cited by examiner

PROCESS TO MAKE CORE-SHELL STRUCTURED NANOPARTICLES

GOVERNMENT INTEREST

This invention was made with government support under Contract No. DE-AC52-06NA25396 awarded by the U.S. Department of Energy. The government has certain rights in the invention.

FIELD OF THE INVENTION

The present invention relates to a process to make nanoparticles, in particular to a process to make core-shell structured nanoparticles.

BACKGROUND OF THE INVENTION

The development and production of nanoparticles has been the focus of research efforts for at least the last ten years with the properties of nanoparticles often exhibiting behavior that bridges the gap between bulk materials and atomic or molecular structures. For example, nanoparticles can exhibit properties that are dependent on the size of particles and properties such as melting temperatures, thermal and/or electrical conductivity, physical hardness and the like can be vastly different when compared to bulk materials having the same chemical composition.

Methods used to produce metal nanoparticles include gas evaporation, mechanical attrition, sputtering, pyrolysis of organometallic compounds, microwave plasma decomposition of organometallic compounds and the like. Plasma decomposition of dry precursor powders has proven to be an effective method for producing nanoparticles since dry precursor powders can simplify material handling concerns, a relatively tight range of particle size can be obtained and acceptable production rates are available. However, previous methods to produce core-shell structured nanoparticles have been limited to methods that suffer from large particle size distribution and low production rates. As such, a process for making core-shell nanoparticles that does not suffer from prior art disadvantages would be desirable.

SUMMARY OF THE INVENTION

Disclosed is a process for making a composite material that contains core-shell structured nanoparticles. The process includes providing a precursor in the form of a dry precursor powder, a liquid and/or a vapor of a liquid that contains a core material and a shell material, and suspending the precursor in an aerosol gas to produce an aerosol containing the precursor. In addition, the process includes providing a plasma that has a hot zone and passing the aerosol through the hot zone of the plasma. As the aerosol passes through the hot zone of the plasma, at least part of the core material and at least part of the shell material in the aerosol is vaporized.

In some instances, the aerosol vapor initially transports the precursor into the plasma hot zone, the hot zone being a region of high electromagnetic energy generated with radio frequency, microwave energy or direct current discharge. New particles are created in the hot zone by reorganization of atoms from the precursor, and sometimes atoms from the aerosol gas as well. Thereafter the aerosol gas carries the new particles out of the hot zone and into a plasma after glow region where extremely rapid cooling occurs. The particles can then be carried into a zone that is near ambient temperature where the particles can be removed from the plasma system, generally with a filter.

DETAILED DESCRIPTION OF THE INVENTION

Figure 1:
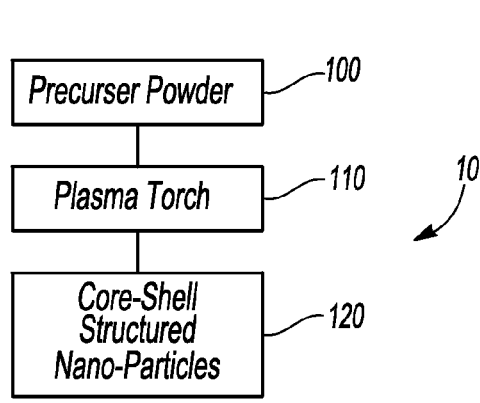
FIG. 1 is a flow diagram illustrating a method for producing core-shell structured nanoparticles.

The present invention includes a process for making a composite material that contains core-shell structured nanoparticles. The core-shell structured nanoparticles can be used as an electroactive material, a catalyst material, a hydrogen storage material and the like. As such, the present invention has utility as a process for making a material.

The process includes providing a precursor in the form of a dry powder, a liquid and/or a vapor of a liquid that contains a core material and a shell material. It is appreciated that the core material can be the precursor for the core and the shell material can be the precursor for the shell of the core-shell structured nanoparticles. The dry precursor powder, liquid and/or vapor of a liquid is suspended in an aerosol gas to produce an aerosol that contains the core material and the shell material. For the purposes of the present invention, an aerosol is defined as a gaseous suspension of fine solid particles and/or liquid drops. The process also includes providing a plasma, the plasma having a hot zone. The aerosol is passed through the hot zone of the plasma, with at least part of the core material and at least part of the shell material being vaporized. The hot zone is a region of high electromagnetic energy that can be generated using radio frequency, microwave energy or direct current discharge.

New particles are created in the hot zone by the reorganization of atoms from the precursor, and sometimes atoms from the aerosol gas and/or plasma gas as well. Thereafter, the aerosol gas carries the new particles out of the hot zone and into a plasma after glow region. The after glow region is a volume of space downstream from the hot zone where extremely rapid cooling occurs that can impact the new particle structure. Upon exiting the after glow region, the particles are received into a zone having near ambient temperature where the highly transformed particles created in the hot zone and afterglow region from the atomic constituents of the precursor, and in some gases the plasma carrier gas and/or aerosol gas, are removed from the system, typically with a filter. These particles, if processed according to the teachings herein, are core-shell particles and in some instances having a core made from a single element.

The plasma can be a non-oxidizing plasma and in some instances is a low power atmospheric or near-atmospheric pressure plasma with the plasma generated by focusing microwave energy within a coupler. The aerosol gas can be an inert gas, illustratively including helium, argon and combinations thereof. The process can further include passing a plasma gas in addition to the aerosol through the hot zone of the plasma, the plasma gas also being an inert gas. In some instances, the core material is a lithium alloying material and can contain an element such as tin, silicon, aluminum, germanium, combinations thereof and the like. In other instances, the core material can be a pre-lithiated material in which the lithium alloying material is alloyed with lithium. The shell material can contain an element selected from carbon, nitrogen, oxygen, combinations thereof and the like, illustratively including carbon, carbides, nitrides, oxides and the like.

At least one embodiment of the present invention provides a process for producing core-shell structured nanoparticles that have an outer mean diameter of less than 500 nanometers. In some instances, core-shell structured nanoparticles with an outer mean diameter less than 200 nanometers can be produced, while in other instances core-shell nanoparticles with an outer mean diameter less than 100 nanometers can be produced. In still yet other instances, core-shell structured nanoparticles with an outer mean diameter less than 50 nanometers are produced. The average wall thickness of the outer shell for the core-shell structured nanoparticles is less than 100 nanometers, can be less than 50 nanometers, and in some instances is less than 20 nanometers.

Optionally, an embodiment can include a process wherein a core-shell structured nanoparticle is produced, followed by a treatment to reduce the size of the core within an outer shell and thereby provide a core that occupies from 5 to 99 percent of an inner volume of the outer shell. It is appreciated that a plurality of the composite core-shell structured nanoparticles can be assembled, for example with a binder, to produce an electrode.

Turning now to the figures wherein like numerals correspond to like elements throughout, FIG. 1 illustrates an embodiment for producing a composite material containing core-shell structured nanoparticles at reference numeral 10. The process 10 includes providing a precursor in the form of a powder, a liquid and/or a vapor of a liquid at step 100 and passing the precursor through a plasma torch at step 110. Upon passing the precursor through the plasma torch at step 110, at least part of a shell material and at least part of a core material that is contained within the precursor is vaporized. Vapor containing the core material and the shell material that has been vaporized is then allowed to condense to form core-shell structured nanoparticles at step 120.

Figure 2:
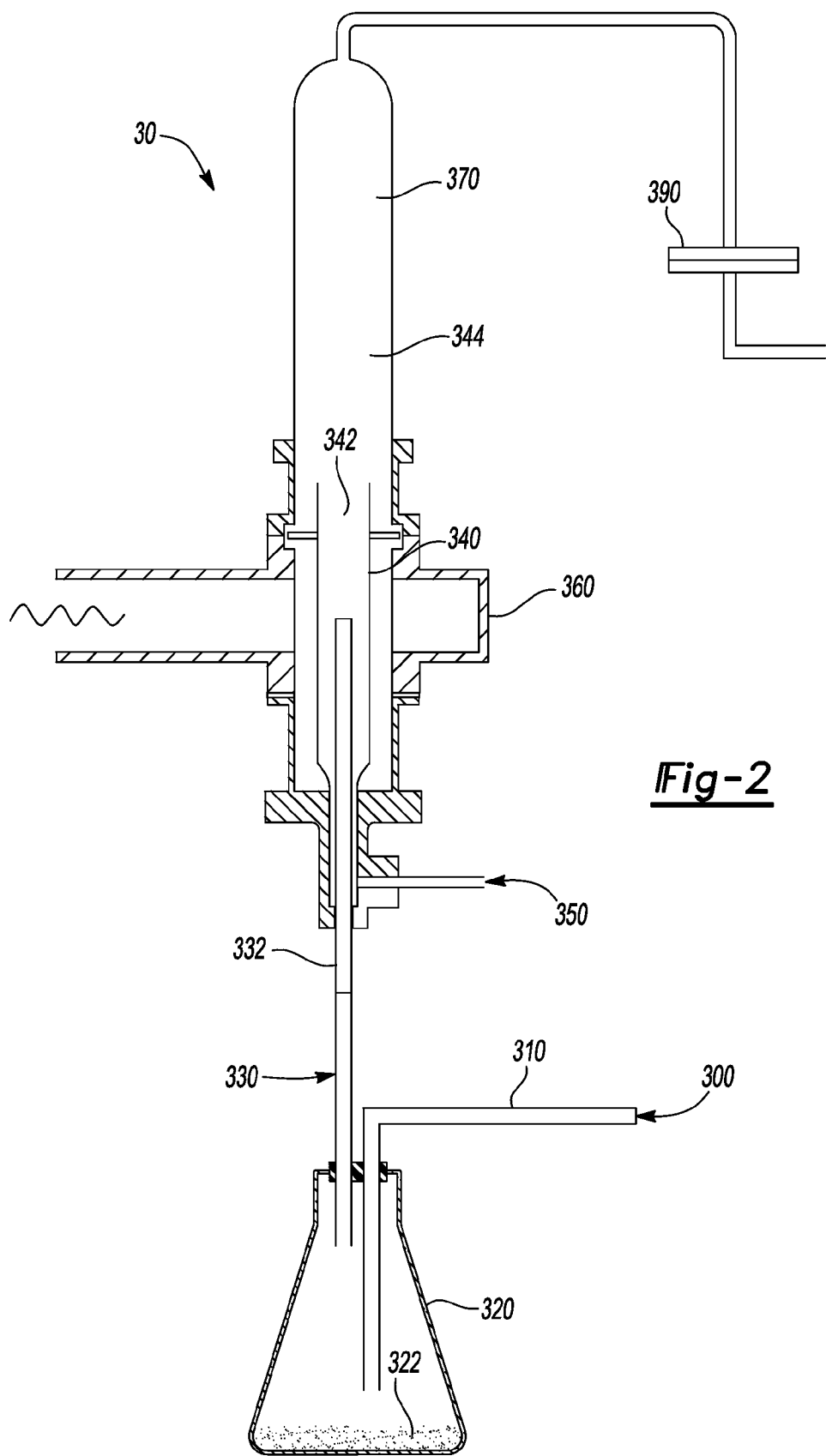
FIGS. 2 and 5 are a schematic representation of an apparatus used to make core-shell structured nanoparticles.

Turning now to FIG. 2, a schematic representation of an apparatus for producing core-shell structured nanoparticles is shown generally at reference numeral 30. As shown in this figure, an aerosol gas 300 passes through an inlet tube 310 into a precursor container 320 that contains a precursor 322. Flow of the aerosol gas 300 into the precursor container 320 at a sufficient flow rate results in the suspension of the precursor 322 within the aerosol gas 300 to produce an aerosol. The precursor 322 can contain core material and shell material. The precursor 322 can also contain elements that are not incorporated within the core and/or shell of any core-shell structure nanoparticles that are produced, but may be present to assist in the overall process in some manner.

Figure 3:
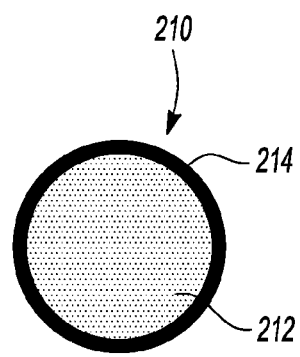
FIG. 3 is a schematic representation of a core-shell structured nanoparticle made according to an embodiment of the present invention.
Figure 4:
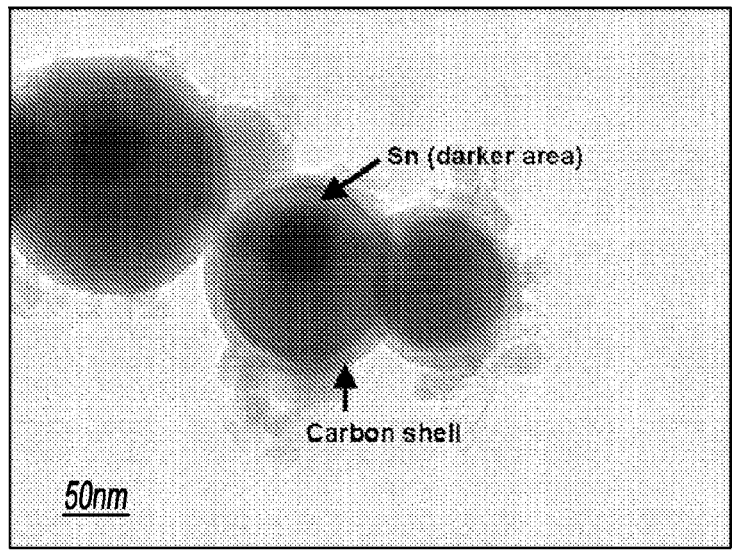
FIGS. 4 and 6 are a transmission electron microscopy image of core-shell structured nanoparticles made according to an embodiment of the present invention.

After the aerosol has been produced, it can pass or flow through the exit tube 330 with at least part of the exit tube 330 passing into a quartz plasma torch 340. In some instances, the exit tube 330 has a ceramic portion 332 that terminates generally in the middle of a waveguide 360. The waveguide 360 is used to couple microwave energy to the plasma torch 340. Also included can be a plasma gas 350 which passes within the plasma torch 340, but exterior to the ceramic portion 332 of the exit tube 330 which has the aerosol passing therethrough. Upon focusing microwave energy with the waveguide 360 onto the plasma torch 340, a plasma can be generated with a hot zone 342 located within the plasma torch 340. As the aerosol with the precursor 322 passes through the hot zone 342 of the plasma torch 340, the temperature of the hot zone 342 is such that at least part of the precursor liquid 322 is vaporized. The vaporized precursor 322 exits the hot zone 342 of the plasma torch 340 and enters into a chimney region 370. Upon exiting the hot zone 342, the atoms of the vaporized precursor condense into solid particles.

If the precursor 322 contains a core material and a shell material, the passing or flowing of the aerosol through the hot zone 342 of the plasma torch 340 results in the vaporization of at least part of the core material and at least part of the shell material. Thereafter, the core and shell material atoms condense into core-shell structured nanoparticles. The core-shell structured nanoparticles can be collected from a particle filter 390, from the interior sidewalls of the chimney region 370 and/or from a particle trap (not shown).

Not being bound by theory, the mechanism for the formation of the core-shell structured nanoparticles is hypothesized to result from the condensation of core material atoms and shell material atoms to form particles via a nucleation process. The condensed core material atoms and shell material atoms collect on similar nuclei, however based on relative miscibility between the two materials, the shell material atoms are rejected from the core material and thereby form a surface or shell around the interior core. It is appreciated that the rejection of the shell material atoms may or may not occur until cooling has occurred and/or the material has reached an afterglow region 344. After leaving the hot zone, the core-shell structured nanoparticles enter the afterglow region 344 of the apparatus in which no further growth occurs. Therefore, in the afterglow region the core-shell structured nanoparticles are "frozen" into their final configuration, with the cores having an outer shell.

In order to better illustrate an embodiment of the present invention, an example of a process wherein core-shell structured nanoparticles were produced is provided below.

EXAMPLE 1

With reference to FIG. 2, dry precursor powders were provided by hand grinding a mixture of tin particles with crystalline anthracene particles to produce the dry precursor powder 322. The weight ratio of tin to anthracene was 50:1, the tin particles had an average diameter of 50 microns and the mixture of tin particles and anthracene crystals was hand ground until the product appeared fully homogeneous. The dry precursor powder 322 was placed within the precursor powder container 320. Argon with a flow rate of 200 cubic centimeters per minute (cc/min) at standard temperature and pressure (STP) was used for the plasma gas 350 and was passed through the plasma torch 340.

In order to produce an aerosol containing the dry precursor powder 322, argon with a flow rate of 300 cc/min at STP was used as the aerosol gas 300 and allowed to pass or flow into the precursor powder container 320. Upon flowing into the precursor powder container 320 and subsequently exiting therefrom through the exit tube 330, the aerosol gas 300 had tin particles and anthracene particles from the dry precursor powder 322 suspended therein, thereby producing an aerosol. The aerosol containing the tin and anthracene particles exited the ceramic portion 332 of the exit tube 330 and entered the hot zone of the plasma generally at the middle of the waveguide section 360. The waveguide section 360 coupled microwave energy to the plasma torch 340 such that an absorbed power of approximately 900 watts was present. In this example, the plasma torch was made from a quartz tube. The plasma itself was confined within the quartz torch 340 and the residence time of the plasma gas and the aerosol was relatively short, for example less than 1 second. Thereafter, new particles passed from the hot zone to an after glow region and finally to a zone that was at near ambient temperature. Using these parameters, core-shell structured nanoparticles having a tin core and a graphite shell with a mean nanoparticle diameter of 50 nanometers and a relatively tight size distribution were produced. FIG. 3 illustrates such a nanoparticle generally at reference numeral 210, the core-shell structured nanoparticle 210 having an inner core 212 and an outer shell 214 and FIG. 4 shows a transmission electron microscopy (TEM) image of actual tin core-carbon shell nanoparticles produced using the parameters disclosed above.

Although the above example produced tin-graphite nanoparticles, it is appreciated that other precursor powder materials can be used to produce other core-shell structured nanoparticles. For example, any lithium alloying material can be used as the core material and compounds containing carbon, nitrogen, oxygen, phosphorus, sulfur and the like can be used as the shell material. In some instances, the core material can contain elements such as tin, silicon, aluminum, germanium, combinations thereof and the like. It is also appreciated that the core material can be a pre-lithiated material wherein the core material within the dry precursor powder 322 is a lithium alloying material that has been alloyed with lithium. The passing of the pre-lithiated material through the hot zone 342 of the plasma torch 340 results in its vaporization and subsequent condensation into pre-lithiated cores.

EXAMPLE 2

Figure 5:
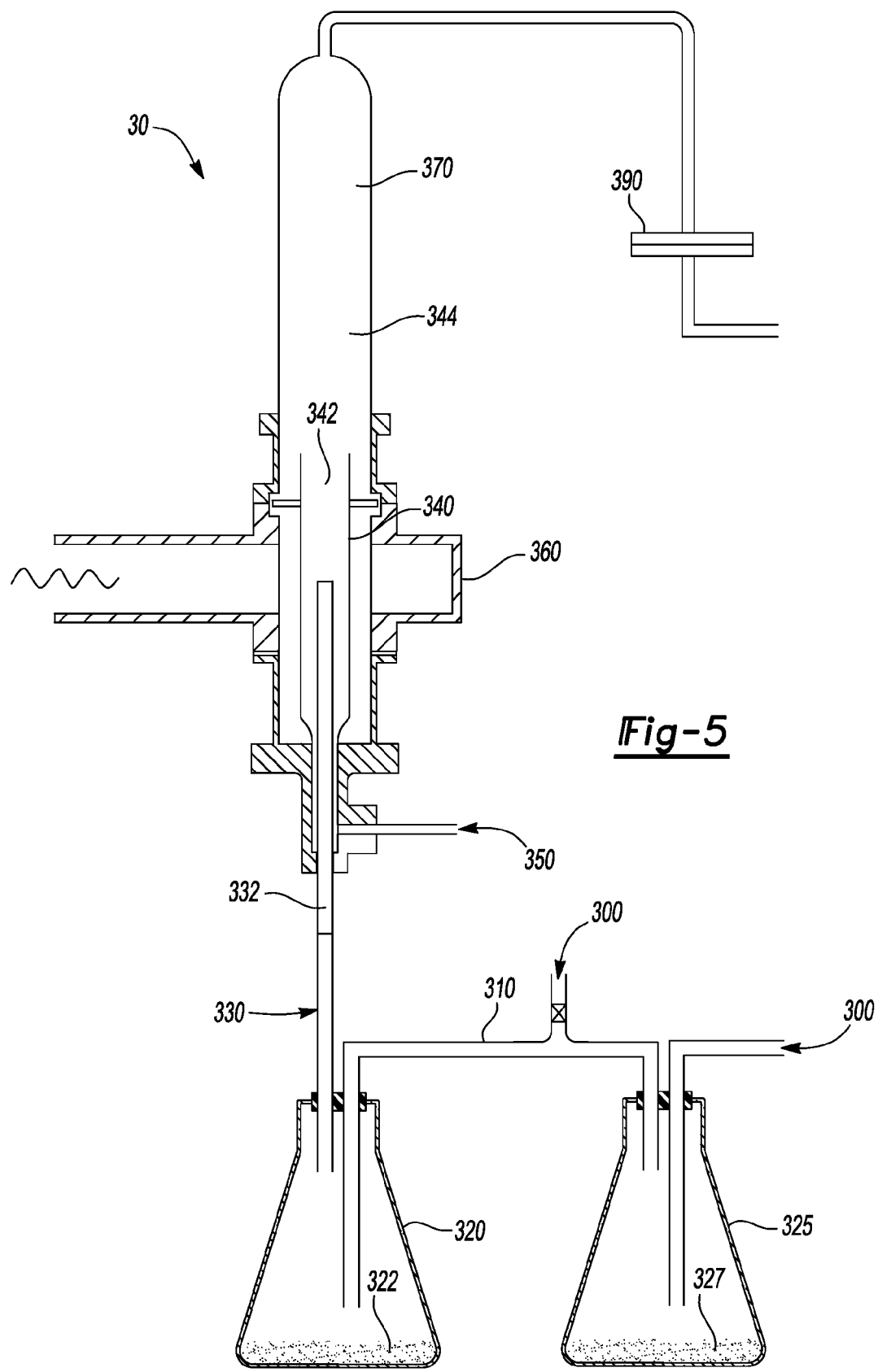

With reference to FIG. 5 wherein like numerals correspond to like elements referenced in FIG. 2, dry precursor powders were provided as described above for Example 1, in addition to a liquid carbon source 327 in the form of hexane ($C_6H_{14}$) and/or its vapor. It is appreciated that hexane is a colorless liquid at room temperature, melts at −95° C., boils at 69° C. and has a vapor pressure of 132 mmHg at 20° C. and 1 atmosphere pressure. It is further appreciated that other liquid carbon sources and other methods of incorporating liquid drops and/or its vapor into an inert gas (e.g. ultrasonic vibration of hexane to produce a direct hexane aerosol) can be used within the scope of the present invention.

Figure 6:
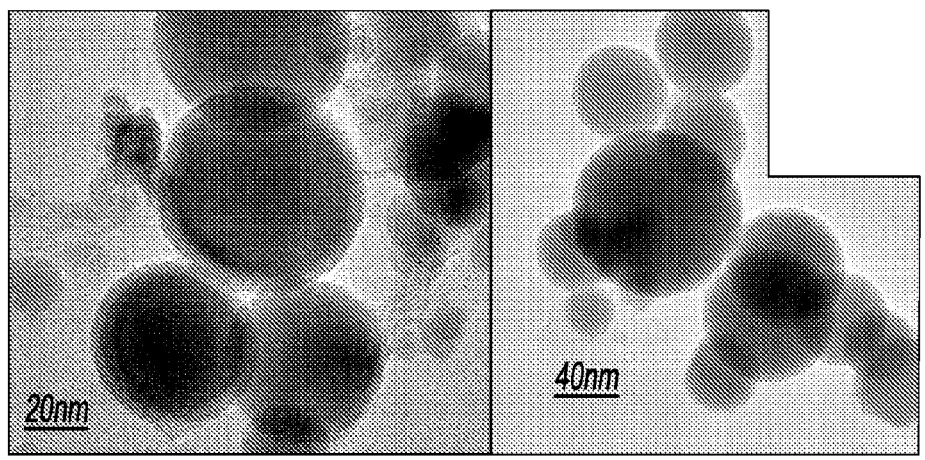

As illustrated in FIG. 5, the liquid carbon source 327 was placed in a container 325 with an aerosol gas 302 flowing into the container 325 and above the source 327 before exiting the container 325. In the alternative, the aerosol gas 302 can flow into the container 325 and bubble through the liquid carbon source 327 before exiting the container 325. In this manner, drops of the liquid carbon source 327 and/or its vapor were suspended in the aerosol gas 302 as it flowed out of the container 325 and towards the container 320. The aerosol gas source 300 was optionally included to better control the amount of dry precursor particles and/or the total gas flow exiting from the container 320 and delivered to the plasma torch 340. For this particular example, approximately 900 watts of absorbed power was present at the plasma torch 340 argon was used as the plasma and aerosol gases. In addition, flow rates of 250 cc/min for the plasma gas 350, 30 cc/min for the aerosol gas 302 and 160 cc/min for the aerosol gas 300 afforded tin core-carbon shell nanoparticles as shown in FIG. 6.

It is appreciated that the present invention is not bound by or to specific flow stream rates, compositions or configurations. In addition, even though the above examples discloses a method having a dual gas flow system with each gas flow having a different overall composition and only joining and mixing at the plasma hot zone, other gas flow and/or plasma systems are included within the scope of the present invention. For example and for illustratively purposes only, a method using a direct current (DC) discharge plasma having a one flow gas system wherein an aerosol gas and a plasma gas are one in the same is within the scope of the disclosed inventive method. This method would result in all of the gas that flows through the plasma and the precursor being well-mixed before reaching the hot zone, as opposed to the two gas flow system wherein the aerosol gas and the plasma gas mix with each other in the center of the hot zone as described in the examples above.

The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

We claim:

1. A process for making a composite material containing core-shell structured nanoparticles, the process including:
   providing a precursor containing a solid core material and a solid carbon shell material;
   suspending the precursor in an inert gas for the purpose of producing an aerosol;
   providing a plasma having a hot zone;
   passing the aerosol through the hot zone of the plasma;
   vaporizing at least part of the solid core material and at least part of the solid carbon shell material;
   removing the solid core material and the solid shell material that has been vaporized from the hot zone of the plasma; and
   allowing the solid core material and the solid shell material that has been vaporized to condense into core-shell structured nanoparticles having a core made from a single element.

2. The process of claim 1, wherein the precursor is a powder.

3. The process of claim 1, wherein the core material is a lithium alloying material.

4. The process of claim 3, wherein the core material contains an element selected from the group consisting of tin, silicon, aluminum and germanium.

5. The process of claim 3, wherein the core material is a pre-lithiated material.

6. The process of claim 1, wherein the inert gas is argon.

7. The process of claim 6, wherein the aerosol passes through a tube that terminates within the hot zone of the plasma.

8. The process of claim 7, further including supplying a plasma gas that passes through the hot zone of the plasma.

9. The process of claim 1, wherein the plasma is a non-oxidizing plasma.

10. The process of claim 1, wherein the plasma is a low power atmospheric or near atmospheric pressure plasma with microwave energy focused within a waveguide.

11. The process of claim 1, wherein the core-shell structured nanoparticles have an outer average mean diameter of less than 500 nanometers.

12. The process of claim 11, further including exposing the core-shell structured nanoparticles to a treatment to reduce the size of a core within a shell of the core-shell structured nanoparticles.

13. A process for making a composite material containing core-shell structured nanoparticles, the process including:

providing a precursor containing a solid core material and a solid carbon shell material;

suspending the precursor in an inert gas for the purpose of producing an aerosol;

providing a plasma torch;

providing an aerosol tube that terminates within the plasma torch;

providing a plasma gas that passes through the plasma torch exterior to the aerosol tube;

generating a plasma using the plasma gas, the plasma having a hot zone;

passing the aerosol through the aerosol tube, the inert gas with the suspended precursor exiting the aerosol tube and entering into the hot zone of the plasma;

vaporizing at least part of the solid core material and at least part of the solid carbon shell material in the aerosol in the hot zone of the plasma;

passing the solid core material and the solid carbon shell material that has been vaporized through the hot zone of the plasma into an afterglow region; and allowing the solid core material and the solid carbon shell material that has been vaporized to condense into core-shell structured nanoparticles having a core made from a single element.

14. The process of claim 13, wherein the precursor is a powder.

15. The process of claim 13, wherein the core material is a lithium alloying material.

16. The process of claim 15, wherein the core material contains an element selected from the group consisting of tin, silicon, aluminum and germanium.

17. The process of claim 15, wherein the core material is a pre-lithiated material.

* * * * *